(12) United States Patent
Scheid et al.

(10) Patent No.: US 8,527,240 B2
(45) Date of Patent: Sep. 3, 2013

(54) WIRELESS SENSOR ASSEMBLY FOR AN AIRCRAFT COMPONENT

(75) Inventors: Paul Raymond Scheid, West Hartford, CT (US); William H. Beacham, Enfield, CT (US); Alexey Sergeev Ouzounov, Bolton, CT (US)

(73) Assignee: United Technologies Corporation, Hartford, CT (US)

( * ) Notice: Subject to any disclaimer, the term of this patent is extended or adjusted under 35 U.S.C. 154(b) by 626 days.

(21) Appl. No.: 12/055,341

(22) Filed: Mar. 26, 2008

(65) Prior Publication Data

US 2009/0248366 A1 Oct. 1, 2009

(51) Int. Cl.
*G06F 11/00* (2006.01)
*H04B 15/00* (2006.01)

(52) U.S. Cl.
USPC ............ 702/188; 702/121; 702/189; 702/190

(58) Field of Classification Search
USPC ................................. 702/179–190, 121–123
See application file for complete search history.

(56) References Cited

U.S. PATENT DOCUMENTS

| | | | |
|---|---|---|---|
| 5,070,722 A | 12/1991 | Hawman et al. | |
| 5,381,692 A | 1/1995 | Winslow et al. | |
| 5,436,826 A | 7/1995 | O'Flarity | |
| 5,717,135 A | 2/1998 | Fiorletta et al. | |
| 6,407,673 B1 | 6/2002 | Lane | |
| 6,429,773 B1 | 8/2002 | Schuyler | |
| 6,434,458 B1 | 8/2002 | Laguer-Diaz et al. | |
| 6,535,116 B1 | 3/2003 | Zhou | |
| 6,580,983 B2 | 6/2003 | Laguer-Diaz et al. | |
| 6,605,948 B2 | 8/2003 | Russell | |
| 6,791,489 B1 | 9/2004 | Richardson et al. | |
| 6,930,614 B2 | 8/2005 | Rackham et al. | |
| 6,963,292 B1 | 11/2005 | White | |
| 6,982,653 B2 | 1/2006 | Voeller et al. | |
| 7,026,918 B2 | 4/2006 | Briick | |
| 7,034,683 B2 | 4/2006 | Ghazarian | |
| 7,146,147 B1 | 12/2006 | Sabatino | |
| 7,155,321 B2 | 12/2006 | Bromley et al. | |
| 7,167,788 B2 | 1/2007 | Loda et al. | |
| 7,183,924 B1 | 2/2007 | Ku | |
| 7,198,227 B2 | 4/2007 | Olin et al. | |
| 7,246,003 B2 | 7/2007 | Loda et al. | |
| 7,251,554 B2 | 7/2007 | Loda et al. | |
| 7,592,783 B1 * | 9/2009 | Jarvinen | 322/2 A |
| 2003/0105565 A1 | 6/2003 | Loda et al. | |
| 2003/0163591 A1 | 8/2003 | Loda | |
| 2003/0233876 A1 * | 12/2003 | Huang et al. | 73/574 |
| 2004/0206818 A1 | 10/2004 | Loda et al. | |
| 2005/0027826 A1 | 2/2005 | Loda et al. | |

(Continued)

FOREIGN PATENT DOCUMENTS

WO 2004066236 A1 8/2004
WO 2006020209 A2 2/2006

*Primary Examiner* — Phuong Huynh
(74) *Attorney, Agent, or Firm* — Carlson, Gaskey & Olds P.C.

(57) ABSTRACT

An aircraft component assembly has an aircraft component for an aircraft. A sensor is configured to monitor the aircraft component. A local wireless transmitter is provided for communication with a remote receiver. In addition, a local wireless receiver is provided for communication with the remote transmitter. A processor is in communication with the sensor. The processor is configured to control the sensor, the local wireless transmitter and the local wireless receiver. A power source is configured to generate energy proximate the installed aircraft component.

16 Claims, 2 Drawing Sheets

(56) References Cited

U.S. PATENT DOCUMENTS

| | | |
|---|---|---|
| 2005/0165534 A1 | 7/2005 | Loda et al. |
| 2006/0015777 A1 | 1/2006 | Loda |
| 2006/0056959 A1* | 3/2006 | Sabol et al. ............. 415/118 |
| 2006/0155432 A1 | 7/2006 | Brown |
| 2006/0164239 A1 | 7/2006 | Loda |
| 2006/0168090 A1* | 7/2006 | Loda et al. ............. 709/208 |
| 2007/0062299 A1* | 3/2007 | Mian et al. ............. 73/763 |
| 2007/0200704 A1 | 8/2007 | Brown |
| 2010/0117859 A1* | 5/2010 | Mitchell et al. ......... 340/870.16 |

* cited by examiner

WIRELESS SENSOR ASSEMBLY FOR AN AIRCRAFT COMPONENT

BACKGROUND OF THE INVENTION

This invention relates to a sensor assembly for an aircraft component.

An aircraft has a number of components that require monitoring by a sensor. Through wires, these sensors communicate to an onboard computer the status and condition of these components. Because these sensors have wires, they require wire harnesses and fasteners to secure the wires to the aircraft in addition to wiring for power. Given the remote location of some aircraft components, the wiring associated with each sensor can be extensive. Consequently, monitoring is often limited to the sensor layout originally designed for the aircraft.

From time-to-time, it is desirable to obtain more information about an aircraft component beyond the data provided by its original sensors. Adding hardwired sensors can be costly and impractical because of the difficulty of installing wiring on the aircraft after its original manufacture. A need therefore exists for a sensor that can easily be installed on an aircraft without the need for wires.

SUMMARY OF THE INVENTION

An aircraft component assembly has an aircraft component for an aircraft. A sensor is configured to monitor the aircraft component. A local wireless transmitter and a local wireless receiver are provided to communicate with a remote receiver and a remote transmitter. A processor is in communication with the sensor and is configured to control the sensor, the local wireless transmitter and the local wireless receiver. A power source is provided to generate energy proximate the installed aircraft component.

The various features and advantages of this invention will become apparent to those skilled in the art from the following detailed description. The drawings that accompany the detailed description can be briefly described as follows.

DETAILED DESCRIPTION OF THE PREFERRED EMBODIMENT

Figure 1:
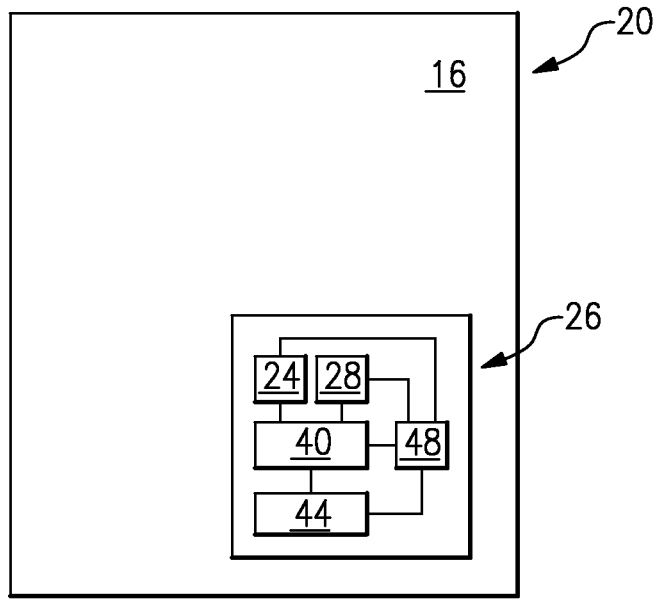
FIG. 1 illustrates a schematic view of aircraft component assembly with wireless sensor assembly.

With reference to FIG. 1, there is shown a schematic view of aircraft component assembly 20. Aircraft component assembly 20 has aircraft component 16, such as an engine component, an environmental control system component, an auxiliary power unit component, a slat component, or any other aircraft component that requires monitoring by a sensor. Sensor 24 is provided and configured to monitor aircraft component 16. Sensor 24 is a smart sensor and has processor 40, memory unit 44 and local wireless transmitter/receiver 28. Memory unit 44 may be readable and writable. Data produced by sensor 24 about aircraft component 16 is communicated to processor 40, which controls sensor 24, local wireless transmitter/receiver 28 and memory unit 44. Processor 40 processes data from sensor 24 and transmits data to remote transmitter/receiver 32 with an authentication protocol that permits access to a remote computer (See FIG. 2).

In addition, sensor assembly 26 has power source 48, which powers sensor 24, local wireless transmitter/receiver 28, processor 40 and memory unit 44. Power source 48 may be an energy generator, which generates energy associated with aircraft component 16, such as from the environment surrounding aircraft component 16 or from aircraft component 16 itself. Energy is thus crated near aircraft component 16 when installed on aircraft 10. For example, power source 48 could obtain energy from vibration of aircraft component 16 or surrounding components. In addition, power source 48 could generate energy from a temperature differential on or around aircraft component 16, given the large temperature differentials between some components of the aircraft and ambient air during flight. There is also static electricity that is created in-flight that may likewise be harnessed by an energy generator. Furthermore, mechanical movement of aircraft component 16 or surrounding components can also generate power sufficient for sensor assembly 26. Power source 48 may include a battery with power sufficient to last between scheduled maintenance inspections. Accordingly, sensor assembly 26 requires no wires for power or for communication. As a consequence, sensor assembly 26 can be installed easily and inexpensively on an aircraft, creating greater opportunity to monitor various in-flight conditions experienced by an aircraft component.

Figure 3:
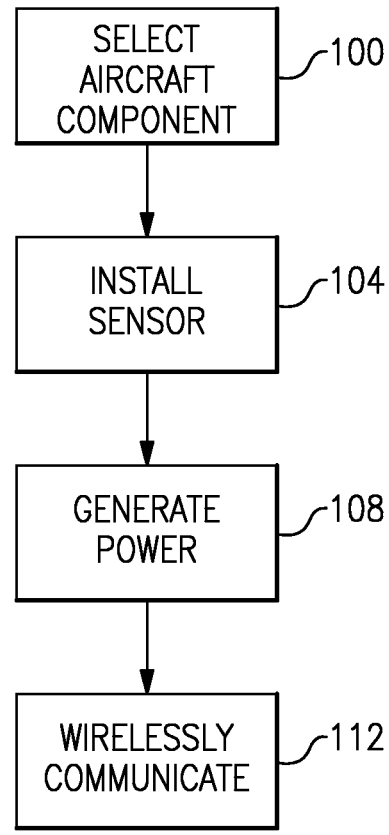
FIG. 3 illustrates a technique for aircraft maintenance.
Figure 2:
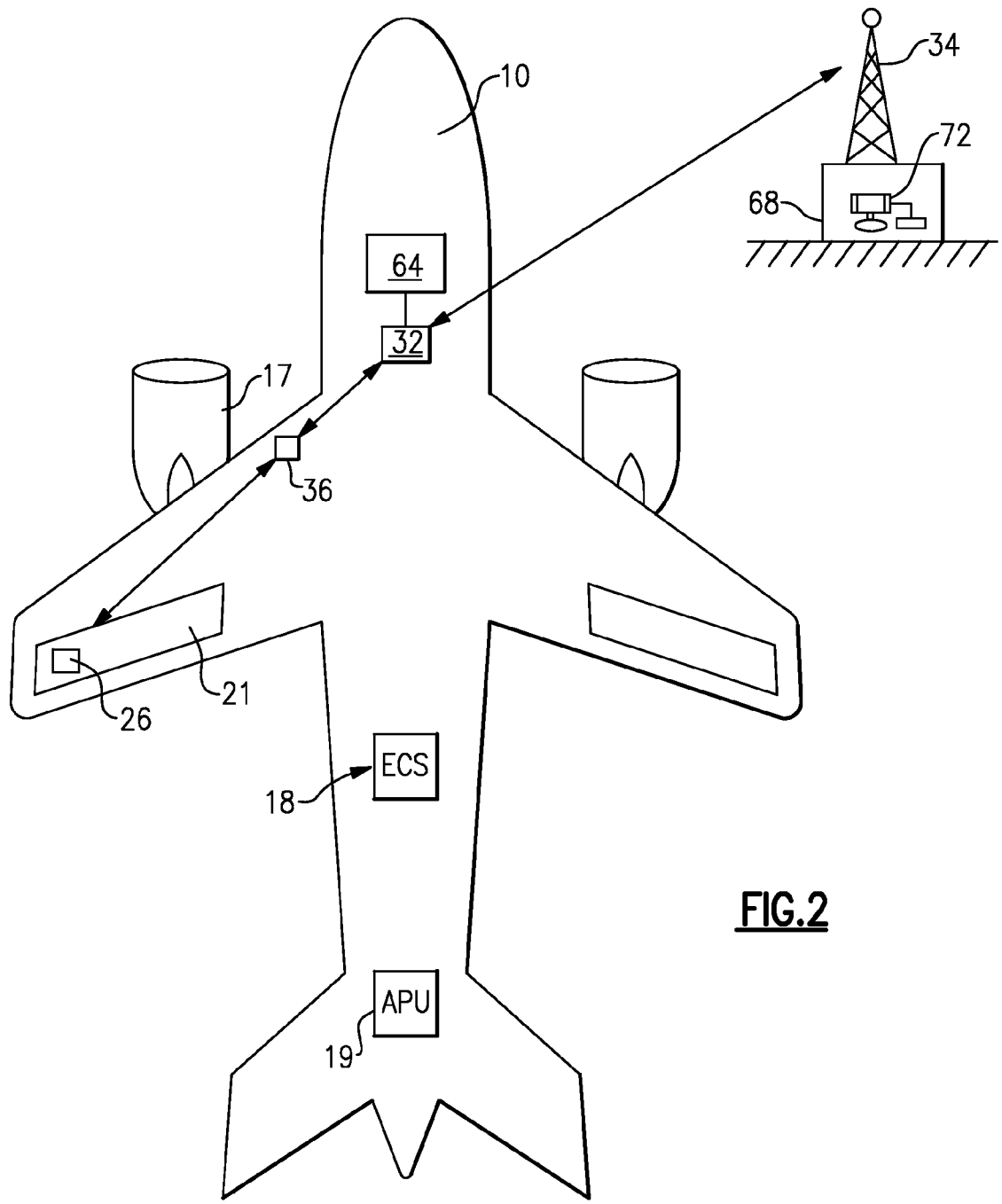
FIG. 2 illustrates a plan schematic view of an aircraft using the wireless sensor assembly of FIG. 1.

With reference to FIG. 2 and FIG. 3, there is shown a method and system for aircraft maintenance. During the course of a ground inspection, a maintenance technician may suspect an issue concerning the operation of aircraft component 16, such as slat component 21, engine component 17, environmental control system component 18, or auxiliary power unit component 19. For example, on the ground, the maintenance technician would select slat component 21 for monitoring (see FIG. 3, step 100). The maintenance technician then installs sensor assembly 26 with an appropriate sensor 24 to monitor the specific condition for diagnosis of the issue (See FIG. 3, step 104). Sensor assembly 26 may have a battery or generate power locally as referenced in step 108 of FIG. 3. During flight operations, sensor assembly 26 wirelessly communicate (See FIG. 3, Step 112) data through local wireless transmitter/receiver 28 to remote transmitter/receiver 32, which is linked to aircraft computer 64. As shown, transmission relay 36 could be provided to boost communication between aircraft computer 64 and sensor assembly 26 by relaying signals between local wireless transmitter/receiver 28 and remote transmitter/receiver 32.

Aircraft computer 64 can then store and manipulate data from sensor assembly 26. A second remote transmitter/receiver 34 may be in communication with aircraft 64 to permit transmission of sensor data to computer 72 at ground facility 68. In this way, without much difficulty, a sensor can be deployed to monitor aircraft component 16 during in-flight operations of aircraft 10. In addition, aircraft computer 64 can transmit to local wireless transmitter/receiver 28 to control sensor assembly 26. In addition, computer 72 at ground facility 68 can likewise control sensor assembly 26 through aircraft computer 64. Sensor assembly 26 has authentication protocol in processor 40 for its secure connection with aircraft computer 64 as well as computer 72 at ground facility 68.

The foregoing description shall be interpreted as illustrative and not in any limiting sense. A worker of ordinary skill in the art would recognize that certain modifications would come within the scope of this invention. For that reason, the follow claims should be studied to determine the true scope and content of this invention.

We claim:

1. An aircraft component assembly, comprising:
   an aircraft component for an aircraft;
   a sensor module having;
   a sensor configured to monitor said aircraft component;
   a local wireless transmitter for communicating with a remote receiver while said aircraft is in flight, wherein said remote receiver is remote from said component, and wherein said remote receiver is a component of a computer at a ground facility;
   a local wireless receiver for communicating with a remote transmitter, wherein said remote transmitter is remote from said component;
   a processor in communication with said sensor, said processor configured to control said sensor, said local wireless transmitter, and said local wireless receiver; and
   a power source powering one of said sensor, said local wireless transmitter, said local wireless receiver and said processor, said power source generating energy from an environment surrounding the aircraft or the aircraft component when said aircraft component is installed on the aircraft and using the generated energy to power at least one of the sensor, the local wireless transmitter, the local wireless sensor, and the processor.

2. The aircraft component assembly of claim 1 including a memory unit in communication with said processor.

3. The aircraft component assembly of claim 1 wherein said power source obtains energy from vibration proximate said aircraft component.

4. The aircraft component assembly of claim 1 wherein said power source obtains energy from a temperature differential proximate said aircraft component.

5. The aircraft component assembly of claim 1 wherein said power source obtains energy from static electricity proximate said aircraft component.

6. The aircraft component assembly of claim 1 wherein said power source obtains energy from mechanical movement proximate said aircraft component.

7. The aircraft component assembly of claim 1 wherein said aircraft component is one of an engine component, an environmental control component, an auxiliary power component, or a slat component.

8. The aircraft component assembly of claim 1 wherein said processor has programming for authentication with a remote computer.

9. An aircraft sensor assembly for monitoring an aircraft component, comprising;
   a sensor configured to monitor an aircraft component;
   a local wireless transmitter for communicating with a remote receiver while an aircraft containing said aircraft component is in flight, wherein said remote receiver is remote from said component, and wherein said remote receiver is a component of a computer at a ground facility;
   a local wireless receiver for communicating with a remote transmitter, wherein said remote transmitter is remote from said component;
   a memory unit;
   a processor in communication with said sensor, said processor configured to control said sensor, said local wireless transmitter, said local wireless receiver and said memory unit; and
   an energy generator that generates energy from an environment surrounding the aircraft or the aircraft component when said aircraft component is installed on the aircraft and that powers at least one of said sensor, said local wireless transmitter, said local wireless receiver, said processor and said memory unit.

10. The aircraft sensor assembly of claim 9 wherein said energy generator source obtains energy from vibration proximate the aircraft component.

11. The aircraft sensor assembly of claim 9 wherein said energy generator source obtains energy from a temperature differential proximate the aircraft component.

12. The aircraft sensor assembly of claim 9 wherein said energy generator obtains energy from static electricity proximate the aircraft component.

13. The aircraft component assembly of claim 9 wherein said energy generator obtains energy from mechanical movement proximate the aircraft component.

14. The aircraft component assembly of claim 9 wherein said processor has programming for authentication with a remote computer.

15. A method of aircraft maintenance, comprising the steps of:
   a) selecting an aircraft component on an aircraft for monitoring;
   b) installing a sensor to monitor the aircraft component;
   c) generating power from an environment surrounding the aircraft or the aircraft component to power the sensor when the aircraft component is installed on the aircraft; and
   d) wirelessly transmitting data about the aircraft component from the sensor to a remote location while said aircraft is in flight, wherein the remote location is a computer at a ground facility.

16. The method of claim 15 wherein generating power proximate the aircraft component comprises generating power from the aircraft component.

* * * * *